United States Patent [19]
Astle, Jr

[11] Patent Number: 5,562,089
[45] Date of Patent: Oct. 8, 1996

[54] HEATING WITH A MOVING HEAT SINK

[76] Inventor: William B. Astle, Jr, 146 Old Farm Rd., Leominster, Mass. 01453

[21] Appl. No.: 255,255

[22] Filed: Jun. 7, 1994

[51] Int. Cl.⁶ .................. F24H 3/12; F23L 15/02
[52] U.S. Cl. ............ 126/117; 126/110 R; 126/116 R; 126/112; 126/91 A; 165/8; 165/9
[58] Field of Search ............ 126/110 R, 112, 126/91 A, 116 R, 117; 165/8, 5, 9

[56] References Cited

U.S. PATENT DOCUMENTS

| | | |
|---|---|---|
| 3,241,764 | 3/1966 | Dawley et al. |
| 3,276,515 | 10/1966 | Whitfield |
| 3,338,300 | 8/1967 | Turunen et al. |
| 3,695,250 | 10/1972 | Rohrs et al. ............ 126/110 R |
| 3,774,374 | 11/1973 | Dufour et al. |
| 3,823,766 | 7/1974 | Sawyer ............ 165/1 |
| 3,869,529 | 3/1975 | Follette ............ 261/130 |
| 4,081,024 | 3/1978 | Rush et al. ............ 165/62 |
| 4,090,370 | 5/1978 | Vaughan ............ 62/91 |
| 4,099,338 | 7/1978 | Mullin et al. ............ 34/35 |
| 4,478,206 | 10/1984 | Ahn ............ 126/99 A |
| 4,542,782 | 9/1985 | Berner ............ 165/9 |
| 4,730,599 | 3/1988 | Kendall et al. ............ 126/91 A |
| 4,754,806 | 7/1988 | Astle, Jr. ............ 165/6 |
| 4,836,183 | 6/1989 | Okuno et al. ............ 126/110 R |
| 4,909,190 | 3/1990 | Finch ............ 122/1 A |
| 4,967,726 | 11/1990 | Finch ............ 126/99 R |
| 4,971,026 | 11/1990 | Fineblum ............ 126/110 R |
| 5,005,556 | 4/1991 | Astle, Jr. ............ 126/110 R |
| 5,184,600 | 2/1993 | Astle, Jr. ............ 126/113 |

FOREIGN PATENT DOCUMENTS

| | | | |
|---|---|---|---|
| 56-37437A | 4/1981 | Japan ............ 236/44 E |
| 59-1937A | 1/1984 | Japan ............ 236/44 R |
| 220867 | 8/1924 | United Kingdom ............ 165/6 |
| 760803 | 11/1956 | United Kingdom ............ 64/1 |

OTHER PUBLICATIONS

"Energy Conservation Through Heat Recovery", Northern Natural Gas Company (No Date).
"Z Duct Energy Recovery Unit", Des Champs Laboratories, Inc., Bulletin 3–75C, 3 drawings and 2 sheets of performance data (No Date).

Primary Examiner—Carl D. Price
Attorney, Agent, or Firm—Fish & Richardson P.C.

[57] ABSTRACT

A high efficiency hot air furnace transfers substantially all of the combustion heat of a clean fuel gas fire to a stream of cool recirculating air by two heat exchangers both of which are mounted in a common plenum through which cool air is recirculated by means of a blower. It differs from the conventional high efficiency furnace in that the secondary heat exchanger is a porous movable heat sink which is alternately exposed to a stream of hot combustion gas and a part of the cool air stream from the recirculating air blower.

18 Claims, 6 Drawing Sheets

HEATING WITH A MOVING HEAT SINK

This application is related to Astle, U.S. Pat. No. 4,754,806, entitled "Reciprocating Heat Exchanger"; Astle, U.S. Pat. No. 5,005,556, entitled "Efficient Gas Hot-Air Furnace and Heating Process"; and Astle, U.S. Pat. No. 5,184,600, entitled "Regulating the Humidity of a Heated Space by Varying the Amount of Moisture Transferred from the Combustion Gases."

BACKGROUND OF THE INVENTION

The invention relates to comfort and utility heating processes.

Comfort and utility heating processes are widely dependent on burning fuel gases with air in a variety of furnaces. Prominent fuel gases include hydrocarbon gases, such as methane or propane, mixtures of carbon monoxide and hydrogen, and blends of carbon monoxide, hydrogen, and hydrocarbon gases. Frequently, these gases contain noncombustible species such as nitrogen and water.

Whatever the fuel used, it is well known that conventional furnaces rarely utilize all of the potentially useful combustion heat. In broad terms, this inefficiency results because combustion gases are conducted away from the combustion zone through heat exchange arrangements that extract only a portion of the available thermal energy of the combustion gases so that the combustion gases remain at sufficiently high temperatures to facilitate effective convective ejection of the combustion gases through stacks and the like. It is also well known that an increased portion of the thermal energy of the combustion gases can be extracted when forced drafts are provided to remove and dispose of the combustion gases. However, even forced draft systems, until fairly recently, have rarely deliberately cooled the combustion gases below the so-called dew point (that temperature at which the concentration of water vapor in the combustion gases is high enough to reach or exceed saturation).

Combustion of fuel gas with air results in the formation of water vapor and carbon dioxide as principal combustion products. In addition, depending on the air-to-fuel gas feed ratio, small amounts of carbon monoxide are formed, and, depending on combustion temperature, oxides of nitrogen (designated NOx) are formed. Because air supplied to the combustion zone includes about four volumes of nitrogen for each volume of oxygen, the combustion gases inevitably contain a large fraction of nitrogen in addition to the combustion products. Along with oxygen and nitrogen, the supply air always includes water vapor and small amounts of other gases (argon, CO2, transient hydrocarbons, and, occasionally, sulfur or halogen-bearing volatiles). The water vapor in the supply air slightly increases the moisture of the combustion gases. It is also noteworthy that the ratio of water to carbon dioxide in the combustion gases is quite dependent on the fuel gas being burned. Propane, with a higher carbon/hydrogen ratio (3:8) than methane (1:4), yields less water vapor; on the other hand, some natural or manufactured gases inherently carry quantities of water.

Dew point is not the same for all fuel gas combustion processes. Besides the factors cited above, dew point is influenced by the oxygen concentration used in converting the fuel to carbon dioxide and water. In some industrial processes, for example, supply air is occasionally enriched with raw oxygen to increase the flame temperature. In these processes, because the fuel gas contains less nitrogen, it contains a higher partial pressure of water vapor. In other processes, use of excess supply air results in a higher quantity of nitrogen and a lower partial pressure of water vapor in the combustion gas. For practical purposes, however, in the uses to which the present invention primarily applies, it is reasonable to expect a dew point of within a few degrees of 65° C. (150° F.).

Traditional furnaces use an indirect-fired heating process to transfer combustion heat across a barrier and into a fluid such as air or water. In most cases, these furnaces transfer as little as 60% of the combustion heat into the heated fluid, the balance being retained in the combustion gases to assure their efficient disposal by thermal convection.

This waste of heat prompted several developments. One, the so-called direct-fired process, directly blends air to be heated with combustion gases without using an intervening barrier. While the direct-fired process completely eliminates stack heat losses, it is unsuitable for heating a stream of recirculating ambient air because of the potential for noxious gas buildup. As a result, outdoor air, which is invariably colder than a space to be heated, is almost always used for direct-fired heating. Thus, while the direct-fired process is efficient in the sense of using all of the thermal energy of the fuel, it is inefficient from the point of view of conserving heat in the space to be heated. The direct-fired process is most suitable for use as a secondary heat source in a space that has a primary heat source and suffers air losses from time to time. For example, the direct-fired process is suitable for use in a warehouse that has frequent opening of doors and resulting air loss to the outside. When the direct-fired process is used as the primary heat source, continuous leakage of air to the outdoors must balance the flame-heated air brought in by the direct-fired heater to keep the fraction of noxious gases tolerably low.

Indirect-fired units operating under normal conditions emit approximately 50 to 170 ppm of CO (carbon monoxide), a maximum of 110 ppm of NOx, and 80,000 to 120,000 ppm of CO2, all of which is vented to the atmosphere. Direct-fired units operating under normal conditions emit approximately 3 to 5 ppm of CO, 3 to 8 ppm of NOx, and a maximum of 1700 ppm of CO2, all of which is diluted by outside air as it enters the building.

Another approach to recovering heat from the combustion gases is through use of so-called "high efficiency" indirect-fired furnaces. These furnaces use two heat exchange zones: a primary zone in which heat is exchanged through a barrier from the hot combustion gases to preheated ambient air, and a secondary zone in which the combustion gases are further cooled by preheating the ambient air. Unlike conventional indirect-fired furnaces, combustion gases leaving the primary zone are not removed by thermal convection. Instead, a suction fan draws the combustion gases through the secondary zone, where they are cooled by a counter flow of incoming ambient air. Thus, heat exchange in the secondary zone preheats the incoming ambient air before it enters the primary zone.

The two-zone process has the desired effect of recovering substantially all of the sensible heat in the combustion gases that, in a conventional indirect-fired furnace, would be lost to the outside. As noted, a consequence of the two-zone process is that the combustion gas density increases to a point at which convective ejection is no longer feasible. As a result, the combustion gases must be withdrawn and discharged from the secondary zone by means of a positive air conveyance device such as a blower or fan. Due to cooling, the combustion gases are also reduced in volume. These two effects (cooler temperature and lower volume)

make it possible to discharge the combustion gases through smaller ducts that are made from materials, such as polymers, that would be unsuitable for discharging the higher temperature combustion gases of conventional furnaces.

A recognized drawback of the two-zone process is that cooling of the combustion gases to near ambient temperature in the secondary heat-exchange zone inevitably results in the temperature of the combustion gases dropping below their dew point. This causes water vapor to condense as droplets or films on the exhaust-side surfaces of the secondary heat exchanger. While this has the desirable effect of recovering the latent heat of evaporation, impurities in the fuel gas and supply air can cause the resulting water condensate to be highly acidic. As noted above, the combustion gases contain traces of carbon monoxide and nitrogen oxides. Sometimes, the combustion gases also contain small amounts of sulfur oxides and/or hydrochloric acid vapor that is generated by decomposition of chlorine-bearing volatiles carried into the flame zone as contaminants of the fuel gas or supply air. Because all gases are capable of dissolving to one extent or another in water, these corrosive impurities are absorbed in the condensed water vapor. Absorption is further enhanced by the near ambient temperature of the combustion gases in the secondary zone. The result is a highly corrosive liquid that, in addition to jeopardizing the useful life of materials (even most grades of stainless steel) used to form the secondary heat exchanger, is environmentally offensive and may be illegal to discharge into municipal sewage systems without neutralization.

Another approach to recovering heat from the combustion gas is to scavenge the heat from the stack. For example, Astle, U.S. Pat. No. 4,754,806, shows a device that is very effective at removing stack heat, but is intended to work downstream of the primary heat exchanger of the conventional furnace.

Neither direct-fired furnaces, "high efficiency" indirect-fired furnaces, nor stack heat scavenging systems have any effect on the primary heat transfer stage taking place in the conventional furnace fire-box. Instead, they are designed to reduce the combustion heat losses occasioned by the convective ejection through stacks of combustion gases at temperatures several hundred degrees above ambient.

To solve many of the problems of the previously discussed approaches, the present inventor has provided a system in which a movable heat sink is used as the primary heat exchanger. This system, which is described in Astle, U.S. Pat. No. 5,005,556, the contents of which are incorporated by reference, permits recovery of the heat lost in a conventional single-zone furnace without contaminating the ambient air with combustion gas, as occurs in direct-fired systems, and without incurring the problems of corrosive liquids inherent in two-zone indirect-fired systems.

SUMMARY OF THE INVENTION

The present invention features a high efficiency hot-air furnace that uses two heat exchangers to transfer the combustion heat of a clean fuel gas to a stream of cool recirculating air. The two heat exchangers are mounted in a common plenum through which cool air is recirculated by means of a blower. The invention differs from the conventional high efficiency furnace in that the secondary heat exchanger is a porous movable heat sink that is alternately exposed to a stream of hot combustion gas and a portion of the cool air stream from the recirculating air blower.

The invention, through use of a movable heat sink, allows recovery of virtually all of the available heat produced by combustion of a fuel gas. The improved heat recovery is achieved without contamination of the ambient air and without the production of corrosive liquids that can result in component failures or discharge problems. Furthermore, these benefits are obtained without using seals around the movable heat sink, which can warp and deteriorate over time, and in a manner that is independent of ducts or other loads connected to the system. In addition to improving heat recovery, the invention, through use of catalytic materials in the moving heat sink, substantially reduces, or even eliminates, the quantity of noxious gases produced.

The invention can be compared with the typical two-zone high efficiency furnace in that the combustion gas is cooled by a secondary exchanger to a temperature that is both within a few degrees of the ambient recirculating air and below the dew point of the combustion gas. However, unlike the conventional two-zone furnace, no acidic condensate accumulates in the secondary heat exchanger, which in the instant invention is a moving porous heat sink element that is alternately exposed to a stream of combustion gas and cool recirculating air.

In the latter respect, the instant invention is related to Astle, U.S. Pat. No. 4,754,806, entitled "Reciprocating Heat Exchanger"; Astle, U.S. Pat. No. 5,005,556, entitled "Efficient Gas Hot-Air Furnace and Heating Process"; and Astle, U.S. Pat. No. 5,184,600, entitled "Regulating the Humidity of a Heated Space by Varying the Amount of Moisture Transferred from the Combustion Gases," all of which employ a moving porous heat sink to garner the last traces of effective combustion heat from the combustion gas without the accumulation of offensive acidic liquid condensate.

The instant invention differs from these in that the moving porous heat sink operates in conjunction with a primary heat exchanger mounted in the same plenum through which the stream of cool recirculating air is blown by a main air recirculating blower.

The instant invention is distinguishable from related patents such as U.S. Pat. No. 4,967,726 to Finch, U.S. Pat. No. 3,695,250 to Rohrs, and U.S. Pat. No. 4,836,183 to Okuno. The instant invention incorporates a two-zone heat-exchange system within a common plenum while preventing the direct interaction of recirculating air flowing through one portion of a moving porous heat sink at some pressure, constant or variable, with the combustion gases flowing simultaneously through some other portion of the porous heat sink member at some other pressure.

In practice it has been found that the inventions described in Astle, U.S. Pat. Nos. 4,754,806, 5,005,556, and 5,184,600, may be installed and operated as easily and safely as any conventional gas-fired heaters of commerce. Once installed they operate continuously and quite successfully without attention when the pressures of the flowing combustion gas products and the recirculating air streams are both relatively constant within a few tenths of an inch water column pressure of the ambient air pressure.

However, it has been found that, in order to achieve the best results in a system including a combination of a primary exchanger and a secondary moving porous heat sink exchanger mounted in a common recirculating air plenum, certain aspects of the end-use condition need to be compensated for by means not heretofore disclosed in any of the referenced patents. It will be apparent that these same means may be employed in connection with moving porous heat sink heat exchange elements and other devices, regardless of whether the heat sink is mounted in a common plenum with a primary heat exchanger.

Some installations require that the pressure of the recirculating air stream be inherently relatively high compared to the ambient air pressure in order to drive warmed air from a central heating unit to remote spaces. In other situations, flow of the recirculating air stream varies from time to time due to opening and closing of dampers at one or more of several remote locations to be heated. In both of these cases, namely inherently high recirculating air pressure and/or variable flow of the recirculating air stream, dynamic pressure imbalance tends to create adverse flow conditions in the combustion gas and recirculating air streams as the heat sink element moves between their respective paths. The problems are particularly exacerbated by virtue of the fact that a small portion of the recirculating air is used in the systems of U.S. Pat. Nos. 5,005,556 and 5,184,600 to purge the porous heat sink of combustion gas products.

The problem is that steady smooth combustion may be upset if undesirable amounts of air are blown into the fire zone. This does not occur when the recirculating air pressure is less than a few tenths of an inch water column pressure greater than the combustion gas pressure. However, when the pressure difference is varying or exceeds about a half inch of water column pressure, adverse "cross-talk" occurs between the two flowing streams.

This might be overcome by the use of various kinds of seals provided to keep the two flows physically segregated. One might also attempt to deal with pressure imbalances with sensors having output signals that adjust electrical or mechanical features such as blower speeds or the positioning of internal dampers.

However, positive seals or electrical/mechanical adjustment features are unattractive for reasons such as cost and unreliability. It would be most desirable to prevent possible problems from excessive or variable recirculating air pressure by simple means that are failsafe and rely only on passive features of the device without seals or controlled manipulation of movable parts. The invention described herein achieves this so that smooth, undisturbed combustion gas flow is maintained over all practical operating conditions despite high or varying recirculating air pressure.

Various forms of mechanical seals have been suggested and described as means to prevent undesired interaction of the two flowing streams. These seals warp under extreme temperatures, are expensive, subject to wear and are ultimately unreliable. The instant invention, simply and without any mechanical seals, obviates adverse interaction of the two flowing streams by much simpler and more reliable means.

In a preferred embodiment, trace combustion gas is purged from the porous heat sink element with air drawn from the atmosphere at ambient pressure, rather than from the recirculating pressurized air stream. In another preferred embodiment, the invention uses an arrangement whereby each portion of the heat sink member, after moving across the path of the recirculating air stream and before entering the combustion gas stream, passes through a "neutral" pressure zone located external to the air recirculating plenum where the heat sink is exposed to static ambient air.

In another preferred embodiment, each portion of the heat sink element after leaving the hot gas stream passes through a purge air stream drawn from ambient air and then also through a "neutral" zone of static ambient air before entering the air plenum. Upon emergence from the plenum the heat sink again passes through the "neutral" pressure zone before re-crossing the hot gas stream.

The "neutral zone" feature may be usefully employed in other systems employing a moving porous heat sink to transfer heat from one moving gas stream to another as the essentially sole exchanger without the operation of a primary heat exchanger. Examples of such a single exchanger system are described by Okuno in U.S. Pat. No. 4,836,183, by Finch in U.S. Pat. No. 4,967,726 and by Rohrs in U.S. Pat. No. 3,695,250, as well as by Astle in U.S. Pat. No. 5,005,556.

In this arrangement the flowing hot gas and the recirculating air cannot directly interact with one another. Any leakage into or out of each of these streams is due only to the stream's pressure difference relative to ambient air, not by the difference in pressure between the two actively flowing streams. Thus, neither transient variation in the pressure of the recirculating air stream nor constant unduly air pressure inherent in some installations can influence the flow conditions in the combustion gas stream. The "neutral" zone arrangement also obviates any possible inadvertent leakage of combustion gas products into the recirculating air stream.

Another inventive feature applicable to the moving porous heat sink heat exchanger may be used in conjunction with other features of the instant invention or separately as an independent means for off-setting effects of adversely high recirculating air pressure. This feature relies on a physical arrangement of the recirculating air blower within the recirculating air plenum so as to create a narrow "air curtain" zone within the porous heat sink member at a crucial position immediately adjacent the aperture in the plenum wall through which the member enters and leaves.

The "air curtain" effect is created by leaving a small gap between the inner surface of the plenum wall and the external surface of the blower casing that defines the blower's outlet mouth so that, as the heat sink enters the plenum, the heat sink surface facing the blower discharge first passes over this gap before entering the high velocity air leaving the blower outlet mouth. Consequently, a narrow strip of the heat sink surface adjacent the plenum wall aperture faces the low pressure air on the suction side of the blower while the rest of that surface already inside the plenum is subjected to the high velocity air exiting the blower outlet.

Thus, instead of high velocity cool air blowing through the pores in the narrow strip adjacent the plenum aperture, a small amount of air already warmed by passage through the porous heat sink into the high pressure space of the plenum is induced to recycle back to the suction inlet of the air recirculating blower. This changes the flow dynamics in the immediate vicinity of the plenum wall aperture in such a way as to suppress leakage of recirculating air into or out of the "neutral pressure zone" located outside the plenum wall. None of the combustion heat is lost to the system, although an insignificant penalty is imposed on the power consumed by the air blower.

Although the foregoing several described inventive features can be used with a reciprocating heat exchange element, another aspect of the preferred embodiments is that the heat sink element is a rotating element, preferably but not limited to being made of a ceramic material defining a system of throughgoing long narrow parallel pores isolated from one another and formed within a ceramic matrix commonly used as the substrate for manufacture of so-called catalytic converters for automobile exhaust gases. These pores provide the passages for flow of combustion gas in one zone and for recirculating air at another zone as the element is rotated between the combustion gas stream and the recirculating air stream.

In a variant of this embodiment, when desired, the ceramic matrix can be treated to provide a catalytic surface capable of fostering the elimination of noxious gaseous species in the combustion gas.

Another important aspect of the instant invention is that the fuel gas combustion process is confined within a tubular duct having an outlet located in close proximity to one face of the porous moving heat exchange element. The duct may be of any convenient cross-sectional shape, and its length, diameter and path configuration can be chosen to optimize both the combustion process and heat transfer effects.

The combustion duct is located in the recirculating air plenum and at least part of the combustion heat is transferred to the air by conduction through the wall of the duct. In that respect the duct may be regarded as a so-called "primary" heat exchanger, and the moving porous heat sink may be regarded as a so-called "secondary" heat exchanger. The fraction of total combustion heat transferred to the air by each exchanger may differ from one embodiment to another, but it is essential that the combustion gas never be cooled within the "primary" duct below a temperature at which moisture vapor condenses.

The location of the combustion duct relative to the heat sink may be such that the recirculating air encounters the two heat exchange stations in series, in parallel or in a combination of both series and parallel paths. For descriptive purposes, however, the combustion tube is regarded as the primary heat exchanger, bearing in mind that in practical installations as much as half or more of the total combustion heat may be imparted to the air stream by the porous heat sink member, the "secondary" heat exchanger.

The temperature of the hot gas in the combustion duct may be as high as 2500° F., but it is cooled as it moves toward the entrance face of the heat sink where it enters the porous material at a temperature ranging from 300° F. to over 1500° F., depending on specific applications of the heater. When the heat sink has been treated with a catalyst material intended to suppress noxious gas components, the design features of the system will be adjusted to provide that the gas entering the porous element is at an optimum temperature for that chemical effect.

In any case, under ideal operating conditions, the hot gas is cooled by passage through the heat sink to within a few degrees of ambient air temperature before it exits the heat sink pores.

The heat sink is continuously rotated at a speed of several rotations per minute so that it traverses alternatingly through the hot gas stream and the cool recirculating air stream. The residence time of any region of the heat sink in each of these zones will be on the order of a few seconds or less. The flow velocities of the hot gas and the recirculating air are on the order of a few feet per second, and the thickness of the heat sink is on the order of a few inches so that the flow time through the heat sink is a few tenths of a second. Nevertheless, in the short intervals during which the heat sink is subjected to hot gas flow, its inlet face in that region may be heated to a temperature at which it glows cherry red. Under ideal conditions, its outlet face remains within a few degrees of the recirculating air temperature which had been blown through it only a short time earlier.

The heat sink is generally exposed to cooling air for a longer period of time than it had been heated by the hot gas stream. The objective is for the cool air to extract as effectively as possible the heat imparted to the heat sink by the hot gas. In this respect, it is desirable that the heat sink material be cooled to within a few degrees of the cool air blown through by the air recirculating blower, which discharges the cool air at a velocity sufficient to propel the cool air through the pores of the heat sink. Now heated, the stream of air emerges from the opposite face of the heat sink into a plenum in which the combustion duct is also installed.

The air heated by passage through the heat sink and such other air which bypasses around the heat sink combine and flow over the "primary" combustion duct. The positive pressure of the blower discharging into the plenum is high enough to transport the now warmed air to the remote spaces to be heated. The combustion gas may be cooled below its dew point at some point during its passage through the heat sink but such moisture is immediately re-evaporated into the counter flowing air stream with favorable effects on comfort. Moreover, this process assures capturing 100% of available combustion enthalpy.

DESCRIPTION OF THE PREFERRED EMBODIMENTS

Figure 1:
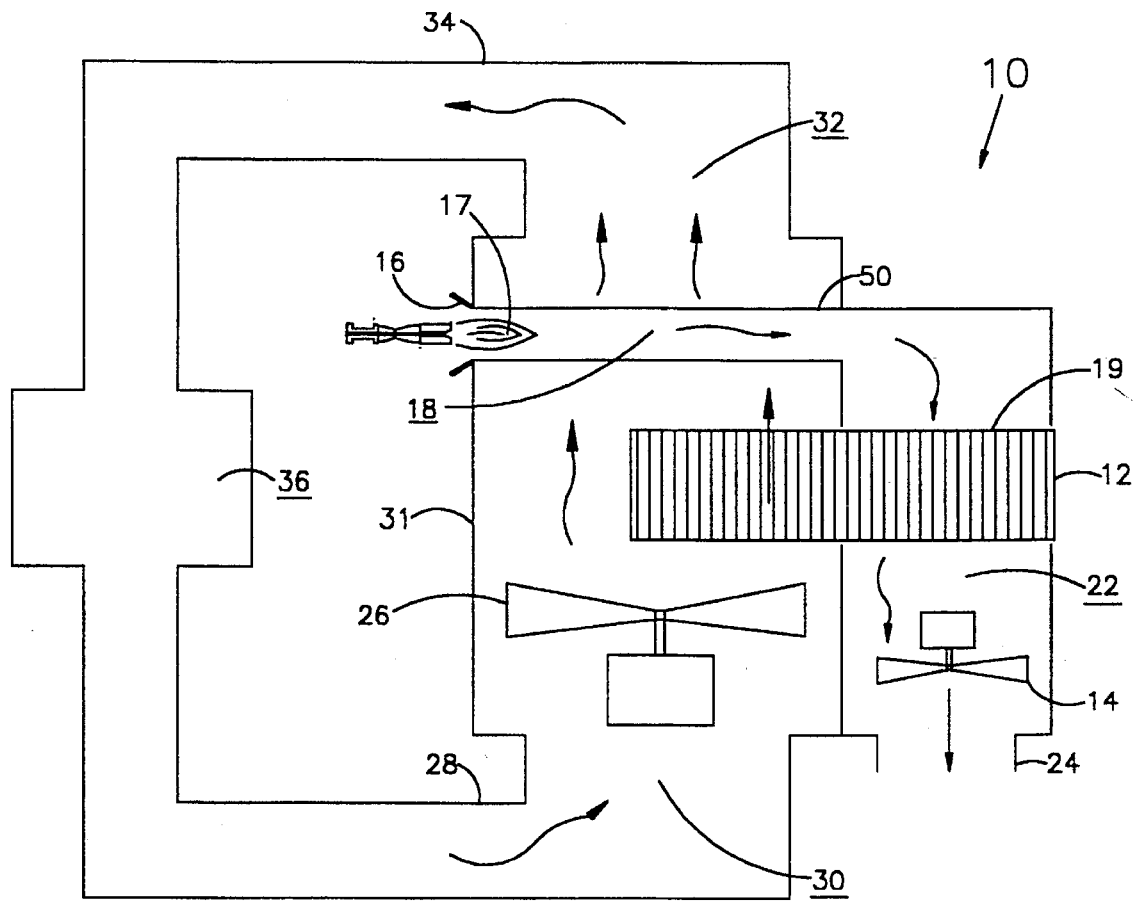
FIG. 1 is a general diagram of a heating device with a rotary heat sink element employed in conjunction with a primary heat exchanger and a common cool recirculating air plenum.

Referring to FIG. 1, heater 10 includes a rotating heat sink 12, (shaft, drive motor and belting not shown) that is disposed so that a portion thereof moves across a stream of hot combustion gas while another portion simultaneously moves across the path of a recirculating air stream. The heat sink element comprises a system of throughgoing pores connecting its two circular faces. The open area presented by the pores approximates 75% to 85% of these faces so that these pores collectively provide a low resistance path for gas flow.

Exhaust fan 14 therefore easily draws the hot combustion gas through the pores of the heat sink and thereby urges ambient air to enter combustion duct 50 via inlet 16.

Clean fuel gas is burned and the resulting flame products 17 combine with supplemental air to form a hot gas stream 18 that is urged toward the outlet end of combustion duct 50 by the suction effect of the exhaust fan 14. The hot gas stream is drawn into the pore openings on a face 19 of a cool region of the rotating porous heat sink 12 and through those pores to the opposite face of the heat sink thereby heating that region of the heat sink. The hot gas is thus cooled as it passes through the pores and exits into space 22 downstream of the heat sink.

Exhaust fan 14 maintains a suction in space 22 and expels the contents of said space via duct 24 to some outdoor receiving area. The temperature of the hot gas at 18 may be as high as 2500° F. and is cooled somewhat as it moves along 50, entering one face 19 of the heat sink at a temperature ranging from 300° F. to over 1700° F., depending on specific applications of the heater. Under ideal operating conditions the hot gas is cooled to within a few degrees of ambient air temperature by passage through the heat sink pores before it exits the opposite face of the heat sink.

The residence time of any region of the heat sink in either the hot gas or cool air stream in each cycle is in the order of a few seconds, and the gas and air flow velocities are such that transit time through the heat sink is a few tenths of a second. Nevertheless, in these short intervals the inlet face of the heat sink may be heated to a temperature at which it glows cherry red and, under ideal conditions, its outlet face remains within a few degrees of the recirculating air temperature which had been blown through it only a short time earlier by the recirculating air blower 26 in plenum 31.

Figure 2:
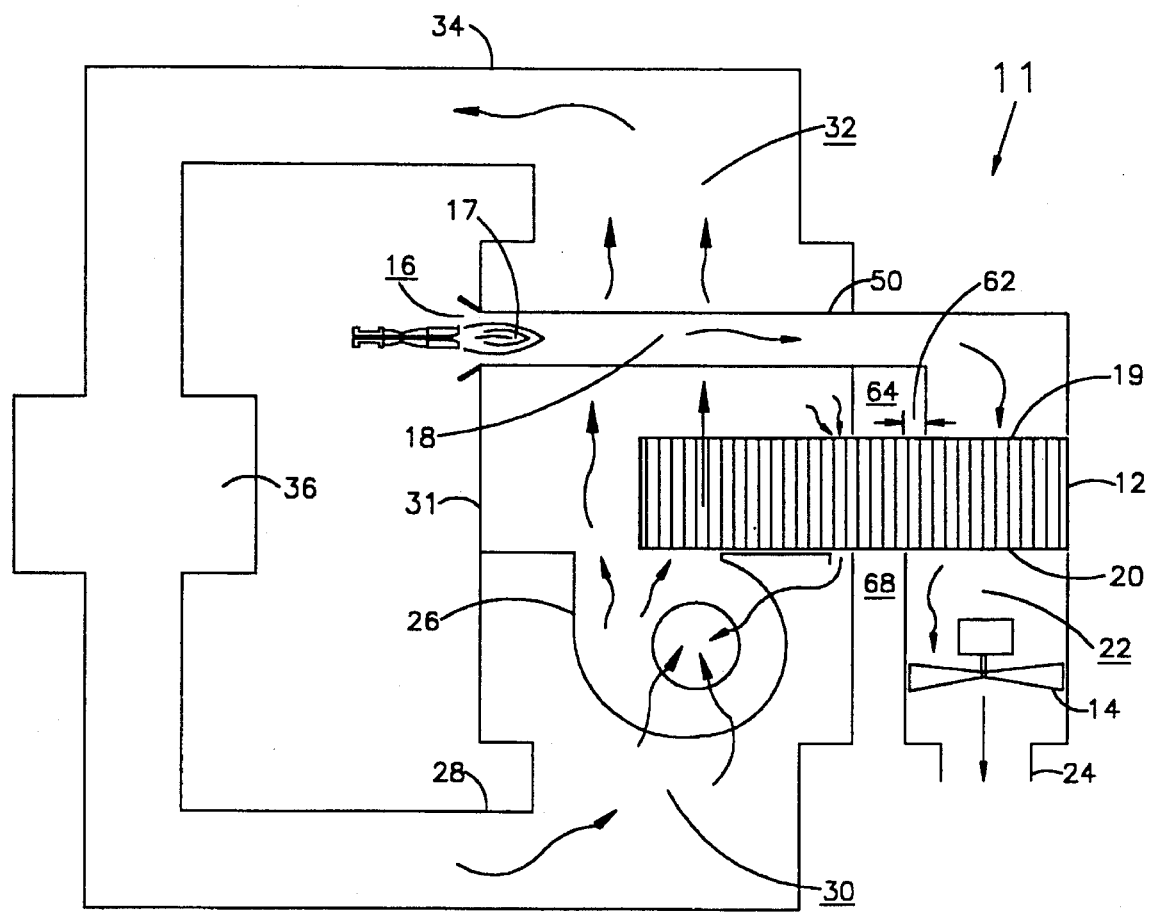
FIG. 2 is a general diagram of an alternate embodiment of the heating device of FIG. 1.

Referring now to FIG. 2, a more preferred embodiment 11 of the invention includes all of the elements indicated in FIG. 1 (which are identified by the same numerals). However, in addition to these elements, the device also has the following features.

Immediately after a region of the porous heat sink moves out of the path of the hot combustion gas, and before that region of the porous heat sink reenters the path of the recirculating air in the plenum, the region moves through two other relatively short zones.

In a zone 62 immediately adjacent the hot gas transit zone, the hot gas inlet face of the heat sink is momentarily exposed to ambient air while its exit face is still under the influence of the exhaust fan draft. Thus, a pulse of ambient air is drawn through the pores to purge combustion gas residues. Although this air is at room temperature, there is no heat lost from the heat sink. Rather, the temperature gradient along the pore lengths from the hot face to the cool face is slightly displaced toward the outlet face.

After leaving the purge zone, the porous heat sink path crosses through the so-called "neutral pressure zone", where the hot gas inlet face is now exposed to ambient air at 64 and its outlet face is exposed to ambient air at 68. Since there is essentially no pressure difference across the heat sink in this zone, there is essentially no flow through the pores. However, the "neutral" zone effectively suppresses interaction between the hot gas and the cool air so that no "cross-talk" can occur between them.

After passing through the "neutral" zone, the heat sink returns to plenum space 32 where it is exposed to the cool air that blower 26 has drawn into a low pressure region 30 of the plenum from a space 36 to be heated, or some other source of cool clean air. The blower discharges air at such a velocity as to propel it through the pores of the heat sink into space 32 of the plenum. Heat absorbed by the heat sink during its exposure to the hot gas stream is transferred to the cool recirculating air stream and the now cooled heat sink region rotates out of the plenum. The air exiting the heat sink mixes with other air blowing over combustion duct 50. The positive pressure of the blower discharging into zone 32 is high enough to transport the now heated air via duct 34 to the remote spaces such as 36.

Cooling the combustion gas in the porous heat sink to a temperature below the dew point of the combustion moisture vapor has the effect of capturing essentially 100% of the available combustion enthalpy. This includes both the sensible heat and the condensation heat of part of the moisture vapor in the exhaust gas.

Figure 3:
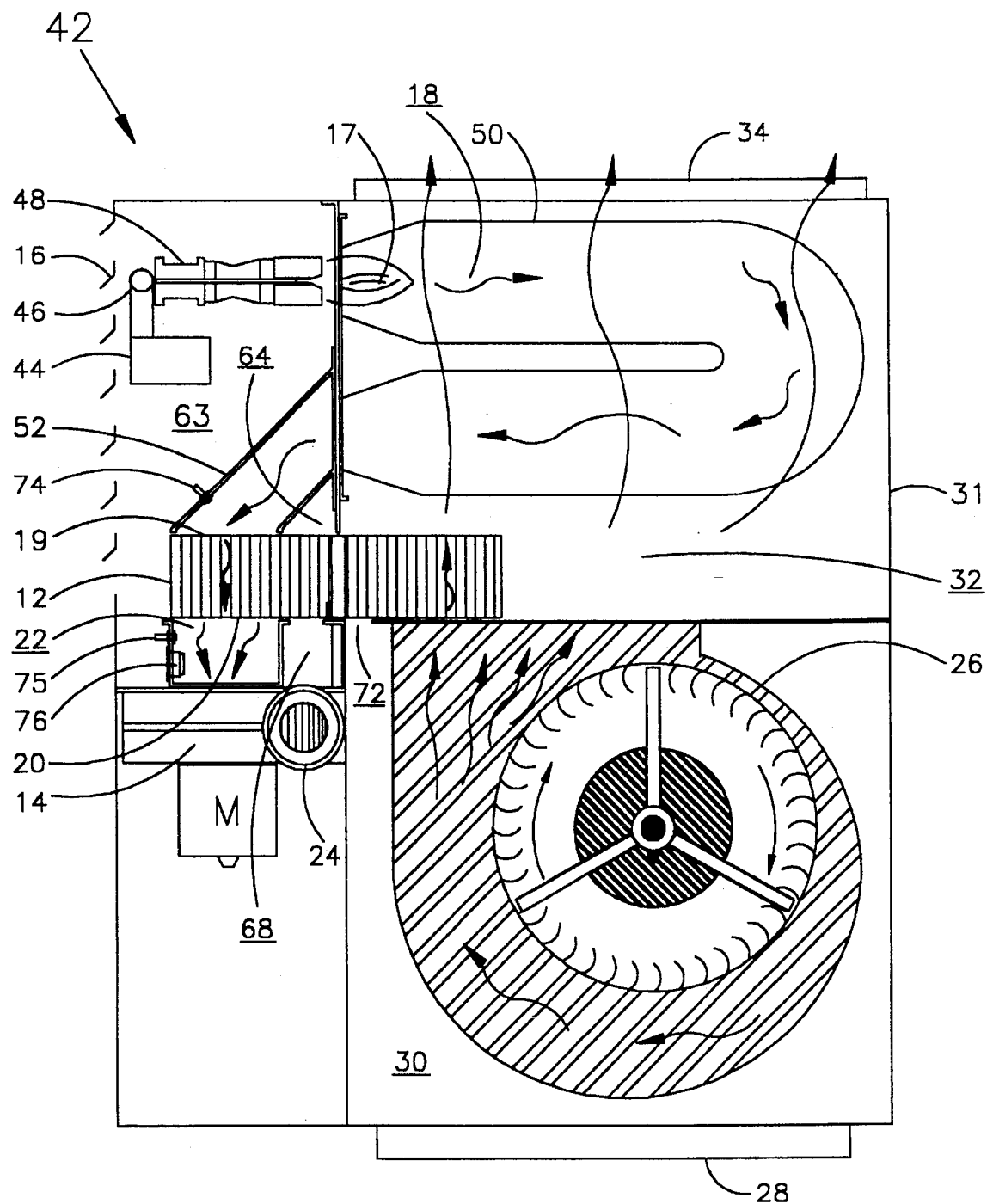
FIG. 3 is a schematic diagram of heating device of FIG. 2.

Referring to FIG. 3, all numerals which are used in common with those shown on FIGS. 1 and 2 identify the same parts. However, the heater identified as 42 in FIG. 3 more faithfully depicts some features. These include: (a) the configuration of air inlet louvers 16 which admit atmospheric air into space 63; and (b) realistic shapes for combustion duct 50 and the conduit 52 that confines the hot gas flow as it flows to the hot gas inlet face of the heat sink at 19. Not shown in the cross-sectional diagram is that outlet face 20 is exposed to the draft of the exhaust fan for a small distance beyond which inlet face 19 is fed by hot gas. This defines the region of the porous heat sink where it is exposed to ambient air that is drawn through the pores to purge them of combustion gas.

FIG. 3 also illustrates the "air curtain" feature of the invention shown as a narrow region 72 bounded by the inner surface of the plenum and the outlet portion of the air blower casing. Air in the space 72 is at a lower pressure than air in plenum region 32. Thus, a small stream of heated air flows back to the lower pressure plenum region 30 where it is drawn into the suction side of the blower. This creates a dynamic flow condition adjacent to the plenum wall which tends to suppress leakage of air out of the plenum space 32 via non-sealed clearances between each surface of the heat sink and the edges of the slot in the plenum wall in which the heat sink rotates.

Also shown is conduit 52, which is mounted outside plenum 32 and joined through its wall to the outlet end of the hot gas duct 50. Hot gas is drawn out the other end of the transition into face 19 of the heat sink and flows through its pores and out the opposite face 20 into space 22 connected to the suction side of exhaust blower 14.

A burner body 48 is fed by gas pipe 46 under conditions determined by controller 44. In combination, pressure sensors 74 and 75 define a differential pressure sensor. When the difference between the pressures sensed by the two sensors exceeds a predetermined value, this indicates that rotary heat sink 12 is blocked. Controller 44 responds to such a pressure difference by shutting off the flow of fuel gas through gas pipe 46, and thereby shutting off heater 42. If a temperature sensor 76 detects a temperature that exceeds a predetermined value, this indicates that rotating heat sink 12 is no longer rotating. As with a blocked heat sink, controller 44 responds to such a temperature by shutting off the flow of fuel gas through gas pipe 46, and thereby shutting off off heater 42.

In the preferred embodiment, rotary heat sink 12 is a ceramic monolith with square openings that are sized so that there are about 400 openings per square inch. The walls that partition the openings are about six thousandths of an inch thick, and rotary heat sink 12 is about three inches deep.

To reduce or eliminate noxious emissions through vent 24, rotary heat sink 12 can include catalytic materials that react with the combustion gases to eliminate particular contaminants. In this regard, rotary heat sink 12 can be made from the catalytic materials or can be coated with such materials. Because most catalytic reactions require considerable heat, only first side 19 of rotary heat sink 12, the hottest side thereof, is coated. Typically, first side 19 is coated to a depth at which rotary heat sink 12 is heated to a temperature of 300° F. Because the catalytic materials have little effect at temperatures less than 300° F., the remaining depth, down to and including second side 20 of rotary heat sink 12, is not coated. In another approach, a separate catalytic converter could be placed within duct 52.

Various catalytic materials can be employed. For example, noble metals, such as gold, silver, or platinum, can serve as oxidation catalysts that oxidize carbon monoxide and hydrocarbons to carbon dioxide and water. Oxidation catalysts, as well as other catalysts, and their use in treating exhaust gases, are described by John B. Heywood in Internal Combustion Engine Fundamentals, pp. 648–57 (1988, McGraw Hill, Inc.), which is incorporated by reference.

Figure 4:
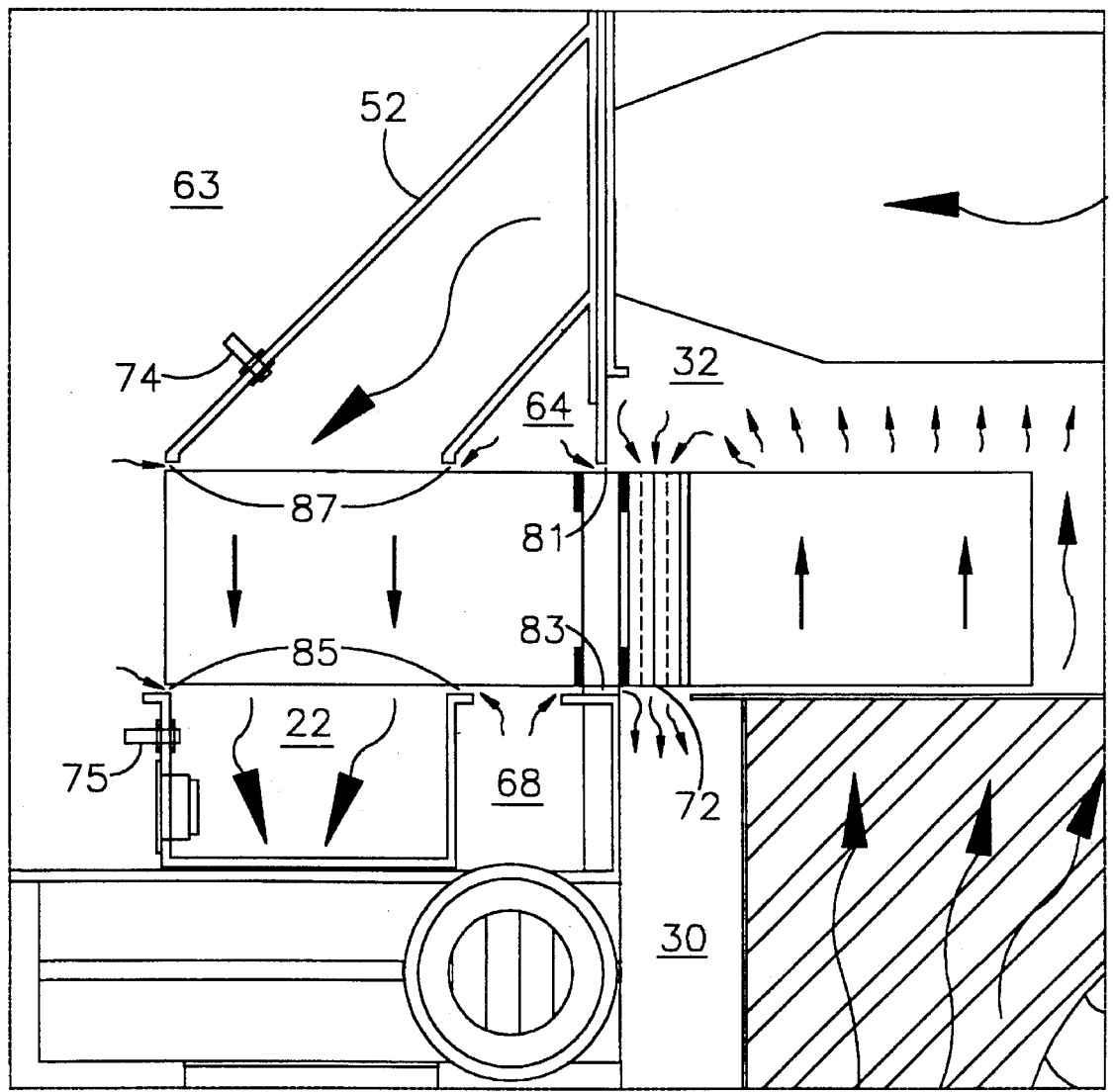
FIG. 4 is an enlarged view of a portion of the heating device of FIG. 3.

Referring to FIG. 4, aspects of the invention are illustrated in more detail with some flow patterns indicated: (a) cooled combustion gas entering space 22, (b) essentially no net flow across the heat sink between 64 and 68, (c) a small stream of air recycling in the "air curtain Zone" at 72, and (d) likely leaks through non-sealed positions 81, 83, 85 and 87. A study of these latter items will confirm that there is no direct path between the higher pressure recirculating air and the lower pressure combustion gas. Possible leakage areas are: (1) out of the recirculating air plenum at 81 and 83 into ambient air spaces 64 and 68 and (2) into the exhaust stream at 85 and 87 from the ambient air spaces 63, 64 and 68. All such leaks are due to non-sealed gaps between the surfaces of the porous heat sink and the edges of duct outlets adjacent these surfaces. Neither of these impose a penalty on the heat transfer efficiency of the system or creates a hazard of contaminating the recirculating air with noxious gas.

To understand the purposes of the air curtain region, it is necessary to appreciate that at each pore outlet an emerging air jet creates its own venturi effect. This will influence air flow patterns for a few millimeters from the face of the heat sink. The effect of this is that under some conditions ambient air can be drawn into the plenum through the non-sealed aperture in the plenum wall, notwithstanding that the static pressure in space 32 is above ambient pressure. The "air curtain" suppresses this effect by providing a narrow strip in the heat sink adjacent to the slot in the plenum wall where no high velocity air is propelled by the blower through the pores.

Instead of air jets blowing into space 32 adjacent the slot, the pressurized air in the plenum space 32 can leak back into the lower pressure space 30 via the "air curtain zone" pores. This air is simply recycled via the blower. In addition, a small amount of ambient air may be drawn into region 72 from outside the plenum wall since the low pressure space 30 of the plenum is likely to be at a pressure below ambient. No adverse effects can be expected from this slight leakage.

Figure 5:
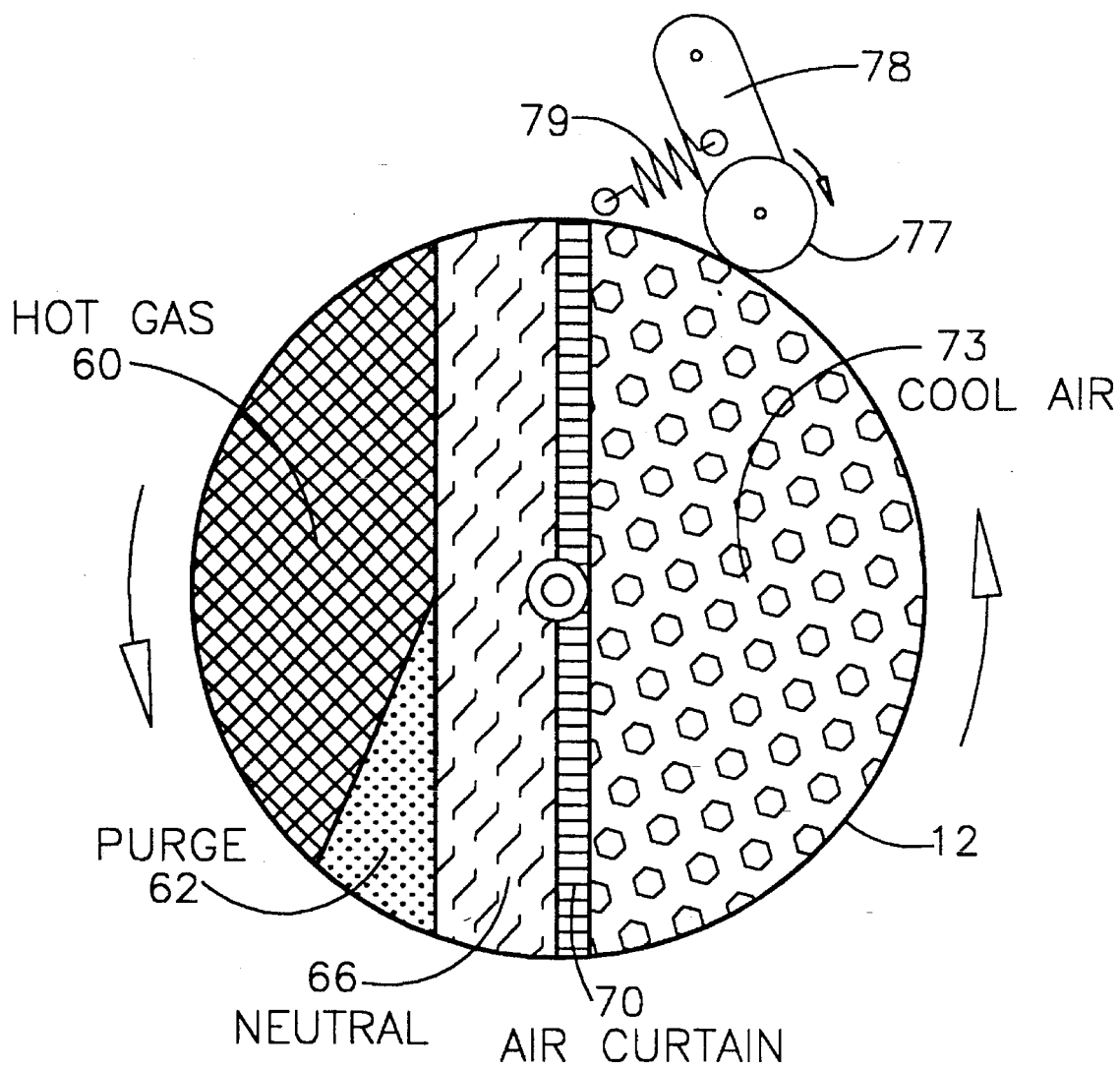
FIG. 5 is a plan view of the rotatable porous heat sink element of the heating device of FIG. 2.

Referring to FIG. 5, rotary heat sink 12 is rotated by a motor driven wheel 77. Wheel 77 is mounted on a pivoting wheel mount 78, and secured against rotary heat sink 12 by a spring 79 attached to pivoting wheel mount 78.

One surface face 19 of the heat sink is shown in plan view delineating the regions where different flows are simultaneously going on in the most preferred embodiment. Hot gas and cool air flow in opposite directions at right angles to the face of the heat sink at 60 and 73. Purge air at 62 flows in the same direction as the hot gas. Essentially no flow through the heat sink occurs in the neutral zone 66.

In the air curtain zone 70 adjacent the plenum wall a small amount of air which has been propelled through region 73 of the porous heat sink is allowed to return to the lower pressure side of plenum and recycled by the blower. The jet flow out of each pore which would have a venturi effect is thereby eliminated.

The "air curtain" feature is such that it can be effectively employed both in the device illustrated by FIG. 1 and the more preferred embodiment illustrated by FIG. 2.

Figure 6:
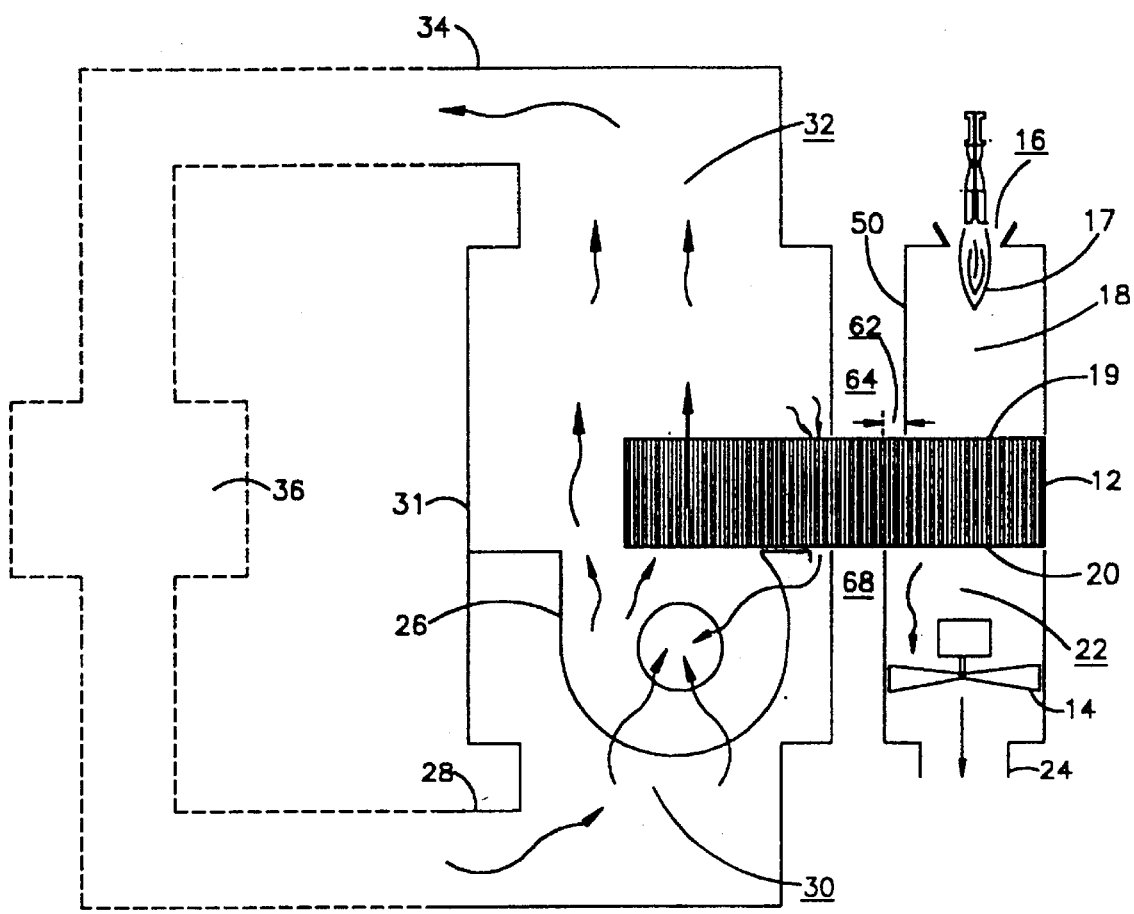
FIG. 6 is a general diagram of use of a "neutral zone" in a system having a single heat exchanger.

Referring to FIG. 6, there is a rotating porous heat sink 12 moving alternately across the path of a cool air stream driven by the blower in plenum 30 and the hot combustion gas stream drawn by exhaust fan 14 from the fire zone 18. In this installation the porous heat sink is essentially the exclusive heat transfer element without a so-called primary heat exchanger as such. "Cross-talk" between the two gas streams is prevented without the use of seals or similar mechanical features because the two streams are constrained to flow in their respective separate paths which are each bounded by separate and non-contacting walls. As a result, a small gap is provided as at 64 and 68 wherein the porous heat sink is momentarily exposed to ambient pressure.

While inventive features have all been illustrated in the case of a ceramic rotating heat sink having straight throughgoing pores, the skilled technician will recognize that these features can be employed in other moving porous heat sinks. These may be in configurations other than cylindrical slabs with throughgoing straight pores. They may be made of non-ceramic materials. For example, the inventive features can be adapted to a reciprocating heat sink or one using a metallic mesh as the heat absorbing medium.

Moreover, it is contemplated that a ceramic member with throughgoing discrete pores can be assembled together with some other heat sink medium. In some cases two or more porous elements comprising the same or different materials may also be assembled with intervening spaces between said elements.

It is also recognized that some environments to be heated will have air heavily burdened by air-borne particles which might accumulate on and partially block flow through the porous heat sink element. Many methods for clearing such contaminants from the porous element will be apparent. We have found an effective and simple method which can be incorporated into any of the embodiments herein described when the burner is not in operation, namely a stream of clean compressed air blown periodically into the porous element from the face opposite that loaded by contaminants. Such a stream of air can be blown against the element from a narrow slit in a pipe or other simple fixture mounted adjacent the exterior surface of the plenum wall which would coincide with the "neutral pressure zone" or ambient pressure side of purge area 62 of the preferred embodiments.

Obviously, in this case the air discharging unit must be positioned so as not to block access of ambient air to the element surface during normal operating cycles, which is relatively easy to do. During the normal operating cycles there will be no need for the cleaning step which may be called for only after several days of normal operation. The compressed air can be fed to the discharging unit through a solenoid valve operating after each heating cycle, on a timed basis, or by actuation from a pressure sensing device set to detect undue resistance to flow through the element in either the hot gas or cold air stream.

Having described the elements of the invention and illustrated them with diagrams of a preferred embodiment, I claim:

1. An apparatus for burning clean fuel gas and transferring heat from a resulting stream of hot combustion gas into a stream of cool air, comprising:

a plenum through which the stream of cool air flows;

a first heat exchanger in the form or a combustion gas duct into which the stream of hot combustion gas is fed and along which the stream of hot combustion gas is propelled to an outlet, said combustion gas duct being positioned in said plenum so that the stream of cool air is heated by said combustion gas duct, and said outlet being connected through a wall of said plenum to a combustion gas conduit;

a second heat exchanger in the form of a movable heat sink element having a first face and a second face connected by a system of pores, said movable heat sink element being positioned relative to said plenum and said combustion gas conduit so that cool air passes through one portion of the movable heat sink element while hot combustion gas passes through another portion of the movable heat sink;

a driver that moves the movable heat sink element so that at least a portion of the movable heat sink alternatingly moves between the cool air in the plenum and the hot combustion gas in the combustion gas conduit; and a neutral pressure zone in which both said first face and said second face are exposed to ambient pressure air, said neutral pressure being positioned so that any portion of the movable heat sink that alternatingly moves between the cool air in the plenum and the hot combustion gas in the combustion gas conduit passes through said neutral pressure zone as the portion moves from the combustion gas conduit to the plenum, and from the plenum to the combustion gas conduit.

2. The apparatus of claim 1, further comprising a purge zone positioned so that combustion gas is purged from a portion of said movable heat sink element by air entering said movable heat sink element from said purge zone and exiting into said combustion gas conduit as the portion of said movable heat sink moves from the combustion gas conduit.

3. The apparatus of claim 2, further comprising:

a recirculating blower for drawing air from a cool air source into said plenum, said recirculating blower being positioned to generate an increased pressure, relative to ambient, in said plenum; and an air curtain zone located adjacent to an inner surface of a wall of the plenum through which the movable heat sink element moves, the air curtain zone providing a narrow transverse region of the movable heat sink element through which pressurized air in the plenum is free to pass to the cool air source.

4. The apparatus of claim 1, further comprising:

a recirculating blower for drawing air from a cool air source into said plenum, said recirculating blower being positioned to generate an increased pressure, relative to ambient, in said plenum; and an air curtain zone located adjacent to an inner surface of a wall of the plenum through which the movable heat sink element moves, the air curtain zone providing a narrow transverse region of the movable heat sink element through which pressurized air in the plenum is free to pass to the cool air source.

5. The apparatus of claim 1, wherein said combustion gas conduit comprises:

an exhaust fan, a hot gas duct outlet in close proximity to said first face of said movable heat sink element, and a cooled gas duct inlet in close proximity to said second face of said movable heat sink element, said exhaust fan, said cooled gas duct inlet, and said hot gas duct outlet being aligned with one another so that said exhaust fan pulls hot combustion gas from said hot gas duct outlet through said movable heat sink element from said first face to said second face and into said cooled gas duct inlet.

6. The apparatus of claim 5, further comprising a recirculating blower for drawing air from a cool air source into said plenum, said recirculating blower being positioned to blow cool air through said movable heat sink element from said second face to said first face.

7. The apparatus of claim 1, wherein the movable heat sink element comprises a rotating element.

8. The apparatus of claims 1 or 7, wherein the movable heat sink element comprises a monolithic unit including a system of continuous parallel pores connecting the two faces.

9. The apparatus of claims 1 or 7, wherein the movable heat sink element is formed of a ceramic material.

10. The apparatus of claims 1 or 7, wherein the movable heat sink element is treated to present to the flowing hot combustion gas a surface suitable for catalyzing the conversion of noxious gases to less noxious species.

11. The apparatus of claim 1, further comprising a catalytic converter positioned in the combustion gas conduit so that combustion gases flow through the catalytic converter before passing through the movable heat sink element.

12. A method of burning clean fuel gas and transferring heat from a resulting stream of hot combustion gas into a stream of cool air, comprising:

passing the stream of cool air through a plenum;

passing the stream of hot combustion gas through a combustion gas duct positioned in the plenum so that the stream of cool air is heated by the combustion gas duct;

passing the stream of hot combustion gas from the combustion gas duct into a combustion gas conduit;

in the combustion gas conduit, passing the stream of hot combustion gas through a first portion of a movable heat sink element to heat the first portion of the movable heat sink element;

moving the movable heat sink element so that the first portion is alternatingly positioned in the combustion gas conduit and the plenum;

in the plenum, passing cool air through the first portion of the movable heat sink element to cool the first portion of the heat sink element and thereby heat the cool air; and passing the first portion of the movable heat sink through a neutral pressure zone in which both said first face and said second face are exposed to ambient pressure air when moving the first portion from the combustion gas conduit to the plenum, and from the plenum to the combustion gas conduit.

13. The method of claim 12, further comprising passing the first portion through a purge zone positioned so that combustion gas is purged from the first portion by air entering the first portion from the purge zone and exiting into the combustion gas conduit when moving the first portion from the combustion gas conduit passing the first portion of the movable heat sink through a neutral pressure zone in which both said first face and said second face are exposed to ambient pressure air when moving the first portion from the combustion gas conduit to the plenum, and from the plenum to the combustion gas conduit.

14. The method of claim 13, further comprising:

generating an increased pressure, relative to ambient, in the plenum by drawing air from a cool air source into the plenum; and passing the first portion of the movable heat sink element through an air curtain zone located adjacent to an inner surface of a wall of the plenum through which the movable heat sink element moves, the air curtain zone providing a narrow transverse region of the movable heat sink element through which pressurized air in the plenum is free to pass to the cool air source.

15. The method of claim 12, further comprising:

generating an increased pressure, relative to ambient, in the plenum by drawing air from a cool air source into the plenum; and passing the first portion of the movable heat sink element through an air curtain zone located adjacent to an inner surface of a wall of the plenum through which the movable heat sink element moves, the air curtain zone providing a narrow transverse region of the movable heat sink element through which pressurized air in the plenum is free to pass to the cool air source.

16. The method of claim 12, wherein moving the movable heat sink element comprises rotating the movable heat sink element.

17. The method of claim 12, further comprising treating the movable heat sink element so that the movable heat sink element presents to the flowing hot combustion gas a surface suitable for catalyzing the conversion of noxious gases to less noxious species.

18. A method of burning clean fuel gas and transferring heat from a resulting stream of hot combustion gas into a stream of cool air, comprising:

passing the stream of cool air through a plenum;

passing the stream of hot combustion gas through a combustion gas conduit;

in the combustion gas conduit, passing the stream of hot combustion gas through a first portion of a movable heat sink element to heat the first portion of the movable heat sink element;

moving the movable heat sink element so that the first portion is alternatingly positioned in the combustion gas conduit and the plenum;

in the plenum, passing cool air through the first portion of the movable heat sink element to cool the first portion of the heat sink element and thereby heat the cool air; and passing the first portion of the movable heat sink through a neutral pressure zone in which both said first face and said second face are exposed to ambient pressure air when moving the first portion from the combustion gas conduit to the plenum, and from the plenum to the combustion gas conduit.

* * * * *